(12) United States Patent
Kimpe

(10) Patent No.: US 12,385,785 B2
(45) Date of Patent: Aug. 12, 2025

(54) METHOD AND SYSTEM FOR COLOUR CALIBRATION USING A BARCODE

(71) Applicant: BARCO N.V., Kortrijk (BE)

(72) Inventor: Tom Kimpe, Landegem (BE)

(73) Assignee: BARCO N.V., Kortrijk (BE)

( * ) Notice: Subject to any disclaimer, the term of this patent is extended or adjusted under 35 U.S.C. 154(b) by 76 days.

(21) Appl. No.: 17/253,641

(22) PCT Filed: Jul. 8, 2019

(86) PCT No.: PCT/EP2019/068301
§ 371 (c)(1),
(2) Date: Dec. 18, 2020

(87) PCT Pub. No.: WO2020/008080
PCT Pub. Date: Jan. 9, 2020

(65) Prior Publication Data
US 2021/0262861 A1    Aug. 26, 2021

(30) Foreign Application Priority Data

Jul. 6, 2018    (GB) ...................................... 1811125

(51) Int. Cl.
*G01J 3/50*    (2006.01)
*G01J 3/52*    (2006.01)
*G06K 7/14*    (2006.01)
*G09G 5/02*    (2006.01)

(52) U.S. Cl.
CPC ................. *G01J 3/506* (2013.01); *G01J 3/52* (2013.01); *G06K 7/1417* (2013.01); *G09G 5/026* (2013.01); *G09G 2320/0693* (2013.01)

(58) Field of Classification Search
CPC .......... G06K 7/1417; G01J 3/506; G01J 3/52; G09G 5/026; G09G 2340/06; G09G 2320/0693; H04N 17/002
See application file for complete search history.

(56) References Cited

U.S. PATENT DOCUMENTS

| | | | |
|---|---|---|---|
| 8,544,748 B2 | 10/2013 | Ming | |
| 8,879,832 B2 | 11/2014 | Delal et al. | |
| 2013/0050504 A1 | 2/2013 | Safaee-Rad et al. | |
| 2013/0343645 A1* | 12/2013 | Dalal | ................... G06K 7/1408 382/162 |
| 2018/0068466 A1 | 3/2018 | Bronkalla | |

FOREIGN PATENT DOCUMENTS

WO    2017121866 A1    7/2017

OTHER PUBLICATIONS

International Preliminary Report on Patentability in corresponding PCT Application No. PCT/EP2019/068301 dated Jan. 21, 2021.
ISR and Written Opinion in corresponding PCT Application No. PCT/EP2019/068301 dated Jan. 20, 2019.

(Continued)

*Primary Examiner* — Yaron Cohen
(74) *Attorney, Agent, or Firm* — HSML P.C.

(57) ABSTRACT

A system and method for performing color calibration using barcodes with colored subunits. The barcode can be decoded in a conventional way and the colors of the subunits can be used for color calibration.

16 Claims, 7 Drawing Sheets

(56) References Cited

OTHER PUBLICATIONS

GB Search Report in corresponding GB Application No. 1811125.2, dated Dec. 19, 2018.
Jiahua Fan et al., Medical Color Displays and Their Calibration, Proc. of SPIE vol. 7450, 2009, pp. 1-12.
Tom Kimpe et al., Color Standard Display Function: A Proposal Extension of DICOM GSDF, Medical Physics, vol. 43, No. 9, Sep. 2016, pp. 5009-5019.
Joonu Ryu, The Modernization of the QR Code Through Color and Brightness Level, pp. 1-22 (2015).
Partial ISR in corresponding PCT Application No. PCT/EP2019/068301, dated Oct. 29, 2019.
Office Action issued in Chinese Application No. 201980044043.0, dated Sep. 5, 2023, English summary provided.
Office Action issued in Chinese Application No. 201980044043.0; dated Mar. 6, 2024, with machine translation.

* cited by examiner

METHOD AND SYSTEM FOR COLOUR CALIBRATION USING A BARCODE

FIELD OF THE INVENTION

The present invention relates to the fields of color calibration of digital displays and image sensors as well as methods of constructing and using these and software and processors for carrying out the methods and for implementing the displays.

BACKGROUND

When operating portable instruments, it is often useful to be able to connect them to an external display. The portable instrument may not have a display, or its internal display may be small or have limited resolution. In such situations it can be useful to use barcodes, or QR codes, to perform the pairing or authentication or authorization between the devices. The barcode can e.g. be shown on the larger display and the portable instrument (having access to an image sensor) can obtain the necessary information by imaging the barcode.

Commonly known barcodes are the one-dimensional stripe codes (read on one direction) and the two-dimensional matrix codes. The matrix codes are often referred to as QRIM (Quick Response) codes. A QR code uses four standardized encoding modes (numeric, alphanumeric, byte/binary, and kanji) to store data. Colored QR codes have recently emerged, involving one or more colors e.g. for aesthetical purposes. An existing image can, for example, be depicted across or behind the QR code, or an image can be put in the centre of the QR code with the actual QR code arranged around it. In some cases, color is added to the code in order to increase the coding density, thus, the color adds a dimension to the existing coding functionality.

U.S. Pat. Nos. 8,544,748 and 8,879,832 disclose the use of colored barcodes where the color is used to increase the coding density. The barcodes comprise fields for calibrating the colors in the barcode, to increase accuracy of the barcode decoding.

SUMMARY OF THE INVENTION

It is an objective of the present invention to provide a barcode where one or more of the subunits of the barcode can be colored in reference colors, so that the barcode can be used as a color calibration reference. The coloring can be performed such that the encoded information already present in the barcode is not altered. The exemplary embodiments of the present invention are illustrated with two-dimensional barcodes, but the invention can also be implemented with a one-dimensional barcode or other types of barcodes. Even though the exemplary embodiments refer to portable instruments, the invention is also suitable for systems having non-portable instruments.

In one embodiment a method carried out by a computer to generate a color calibration LUT (look-up table) can be provided, using a barcode image for an image sensor to achieve a target behaviour. Said barcode can comprise encoded data in subunits of the barcode and at least one subunit of the barcode can have a color point representing a reference color point in a color space, and the target behaviour of the image sensor can be defined by target digital sensor values. The method can comprise the steps of:
  receiving a digital image of the barcode acquired with the image sensor, the digital image being stored with received digital sensor values, for each of the at least one subunit having a reference color point,
  retrieving the received digital sensor value
  obtaining the target digital sensor value for the image sensor corresponding to the reference color point,
  calculating the difference between the received digital sensor value and the obtained target digital sensor value of the image sensor for the reference color point,
  creating a calibration LUT of the image sensor for adjusting digital sensor values of the color point based on the calculated difference.

This has the advantage that color calibration can be performed on an image sensor facing a calibrated display while displaying a barcode having subunits with reference color point(s) on said display. Thus, a color is visible on at least one of the sub-units. The barcode can simultaneously be used for providing decoded information in a conventional way.

In another embodiment a method carried out by a computer to generate a color calibration LUT for a display can be provided, using a barcode image and a calibrated image sensor for the display to achieve a target behaviour, said barcode can comprise encoded data in subunits of the barcode and wherein at least one subunit of the barcode has a target color point in a color space, and wherein the target behaviour of the display device can be defined by the at least one target color point.

The method can comprise the steps of:
  displaying an image of the barcode on the display, the barcode image being displayed with first digital driving levels,
  capturing a digital image of the barcode image displayed by the display device with the calibrated image sensor,
  receiving the acquired digital image, the digital image being stored with digital sensor values, for each of the at least one subunit having a target color point,
  obtaining the acquired color point corresponding to the digital sensor values using the digital sensor values and the calibrated sensor profile,
  obtaining the digital driving levels corresponding to the acquired color point using the display profile
  obtaining the target color point of the subunit
  obtaining the target digital driving levels corresponding to the target color point,
  calculating a difference between the obtained digital driving levels and the target digital driving levels,
  creating a calibration LUT of the display for adjusting the digital driving levels of the display to compensate for the calculated difference.

This has the advantage that color calibration of the display can be performed on the display itself facing a calibrated image sensor while displaying a colored barcode on said display. Thus, a color is visible on at least one of the sub-units. The barcode can simultaneously be used for providing decoded information in a conventional way.

Additionally or alternatively, the barcode can be embedded in a cover glass provided in the field of view of the image sensor.

This has the advantage that the barcode is always available and the color patches can be combined with other calibration patterns, and/or the calibration can be performed without user interaction.

Additionally or alternatively, the encoded information of the barcode can comprise information on the target value and the location of each color point in the barcode.

An advantage is that when the image sensor cannot automatically detect the color of a color patch, this information provides the target value of each color patch and at which location in the barcode it is found.

Additionally or alternatively, the encoded information of the barcode can comprise information on at least one of the type of color space to be used, on the type of color chart to be used, on the location of the subunits whose color is a color point, on the target values of the DDL's or DSV's.

Additionally or alternatively, n subunits can have the color of a color point of the color chart.

This has the advantage of providing information on the color space, color chart, location of color points and the amount of subunits having a color point.

Additionally or alternatively, a multiple of adjacent subunits having the same color can be grouped in a region, or subunits having the same color are not adjacent. For example, the at least one subunit can have a color of a color point of a color chart so that the encoded information carried by the subunit is not affected by the color of the subunit.

It can be advantageous to group the same color points next to each other to increase efficiency, or alternatively, distribute or scatter the colors over different parts of the subunit if e.g. preservation of the encoded data requires colors to be distributed further apart.

Additionally or alternatively, a dedicated location of the barcode can be used to provide metadata or encoded data related to the color chart of the barcode, for example to indicate which type of color chart is provided.

Additionally or alternatively, the barcode can be submitted to a test to confirm that the encoded data is intact by using barcode decoding rules.

This has the advantage of confirming that the encoded information of a barcode remains the same when adding color patches to it.

Additionally or alternatively, the at least one subunit having a color point of a color chart can comprise at least one of primary colors, secondary colors or tertiary colors.

Additionally or alternatively, the method can comprise a non-volatile memory, wherein the target DSV or DDL are available from at least one of the non-volatile memory or the barcode.

Additionally or alternatively, the method can comprise a user menu, wherein the target DSV or DDL are available from the user menu.

Additionally or alternatively, the barcode can be a QR code. In any of the embodiments of the invention the subunits can have the shape of squares, rectangles, triangles, hexagons, dots, circles, or bars, for example.

In another embodiment of the present invention there can be provided a method and means for adding to an existing barcode having initial information, additional information on a color chart in a color space to be used for color calibration of a device. Said method can comprise the steps of changing the colors of at least one subunit of the barcode to a color point of the color chart, wherein the color changing can be performed without altering the initial information of the barcode. Additionally, a test can be performed to check if a barcode may be colored in a new color point without changing the decoded information of the initial barcode. If the decoded information is altered, the initial color of the barcode subunit can be used. Accordingly, a selector can be provide for selecting a subunit having an initial color, means for changing the initial color of the subunit to a new color point of the color chart, means for checking if the initial information of the barcode is intact, if the initial information is intact, keeping the new color point on the subunit, if the initial information is altered, revert to the initial color of the subunit.

This has the advantage of providing a method and means for adding color patches to an existing barcode that may initially be colored, so that the barcode information is preserved and the barocde can also be used for color calibration.

Additionally or alternatively, there can be provided a method comprising the step of adding encoded information to the barcode, which encoded information comprises information on at least one of the type of color space to be used, on the type of color chart to be used, on the location of the subunits whose color is a color point, on the target values of the DDL's or DSV's. Means can be provided (such as an adder) for adding encoded information to the barcode, which encoded information comprises information on at least one of the type of color space to be used, on the type of color chart to be used, on the location of the subunits whose color is a color point, on the target values of the DDL's or DSV's. Additionally or alternatively, an initial barcode of order n can be transformed into a barcode of order n+1.

Additionally or alternatively, said method can be suitable for being applied on an imaging device, said imaging device comprising a display and an image sensor, the method further comprising the step of calibrating the display of the imaging device. Additionally or alternatively, the barcode can be a QR code in any of the embodiments of the invention.

Additionally, there can be provided a data processing system comprising means for carrying out the steps of any of the above-mentioned methods.

Embodiments of the present invention provide a data processing system for generating a color calibration LUT having a barcode image for an image sensor to achieve a target behaviour, said barcode comprising encoded data in subunits of the barcode and wherein at least one subunit of the barcode has a color point representing a reference color point in a color space, and wherein the target behaviour of the image sensor is defined by target digital sensor values, the system comprising:

a receiver for receiving a digital image of the barcode acquired with the image sensor, the digital image being stored with received digital sensor values,
  for each of the at least one subunit having a reference color point,
    means for retrieving the received digital sensor value,
    means for obtaining the target digital sensor value for the image sensor corresponding to the reference color point,
    a calculator for calculating the difference between the received digital sensor value and the obtained target digital sensor value of the image sensor for the reference color point, and
  a calibration LUT of the image sensor and means for adjusting digital sensor values of the color point based on the calculated difference.

Embodiments of the present invention provide a data processing system for generating a color calibration LUT for a display using a barcode image and a calibrated image sensor for the display to achieve a target behaviour, said barcode comprising encoded data in subunits of the barcode and wherein at least one subunit of the barcode has a target color point in a color space, and wherein the target behaviour of the display device is defined by the at least one target color point, the system comprising:
a display for displaying an image of the barcode on the display, the barcode image being displayed with first digital driving levels,
means for acquiring a digital image of the barcode image displayed by the display device with the calibrated image sensor,
a receiver for receiving the acquired digital image, the digital image being stored with digital sensor values,
for each of the at least one subunit having a target color point,
means for obtaining the acquired color point corresponding to the digital sensor values using the digital sensor values and the calibrated sensor profile,
means for obtaining the digital driving levels corresponding to the acquired color point using the display profile,
means for obtaining the target color point of the subunit,
means for obtaining the target digital driving levels corresponding to the target color point,
a calculator for calculating a difference between the obtained digital driving levels and the target digital driving levels, and
a calibration LUT of the display for adjusting the digital driving levels of the display to compensate for the calculated difference.

In any of the embodiments of the present invention, a processing engine can be adapted to execute the generating of the color calibration LUT.

Additionally, there can be provided a computer program product which when executed on a processing engine can carry out the steps of any of the above-mentioned methods.

Additionally, there can be provided a non-transient signal storage medium for storing said computer program product.

Additionally, there can be provided an imaging device comprising an image sensor and a display to display images acquired with the image sensor, said imaging device further comprising the above-mentioned computer program product for calibrating the display. Additionally, the imaging device can be a dermatoscope.

DEFINITIONS

Figure 1:
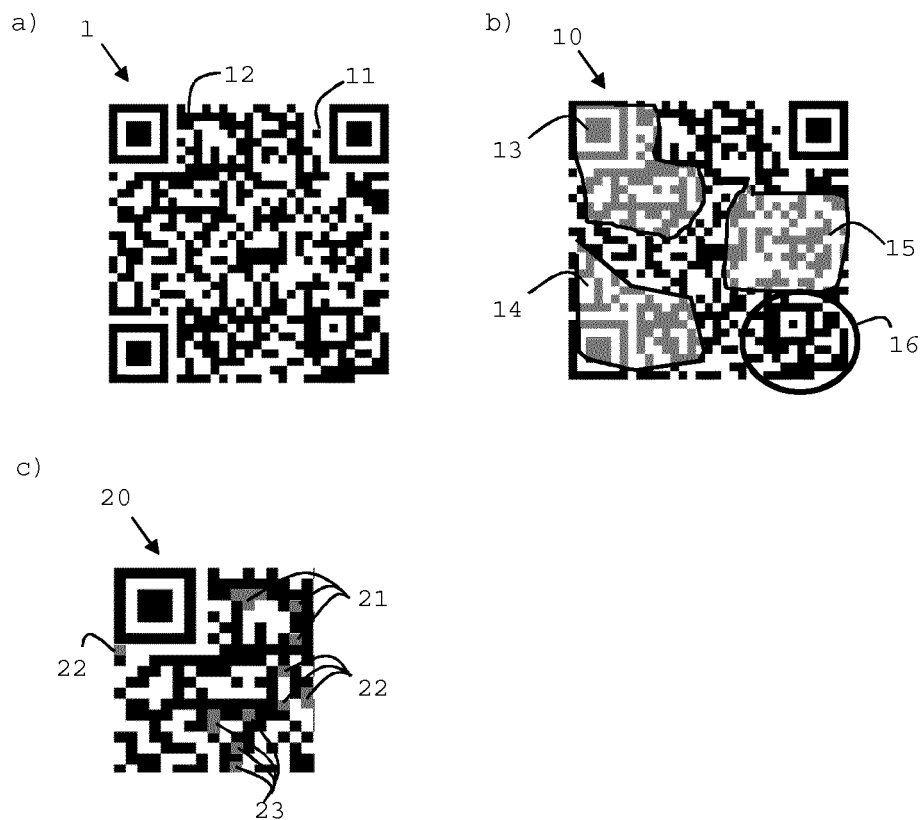
FIG. 1a) shows a conventional barcode or QR code, and FIGS. 1b) and 1c) show an embodiment of the present invention comprising barcodes with colored subunits.

A "barcode" can be described as a one- or two-dimensional pattern that can be read and interpreted by machine visioning means. One-dimensional barcodes can be represented by bars of different thicknesses and placed next to each other with different spacings in between. Such a barcode is read typically along one direction. Two-dimensional barcodes can be built up using subunits of various shapes, e.g. squares, rectangles, triangles, hexagons, dots, circles, bars, etc. There are several standards for how a barcode can be created and interpreted. Two-dimensional barcodes can also be referred to as matrix barcodes or QR (Quick Response) codes. The subunits of a barcode carry encoded information, or the encoded data, which can be decoded with a barcode scanner. For example, a QR code area comprises markings for
positioning (orientation)
size of the data matrix
QR code version
actual data
outer limit at the end of the code area.
See e.g. http://www.qr-code-generator.com/qr-code-marketing/qr-codes-basics/.

A "subunit" of a barcode is the smallest element composing the barcode. For a QR code, a subunit can be a black (or white) square arranged in a square grid on a white background. In general, the subunit of a two-dimensional barcode may also have other geometrical shapes, e.g. circular or triangular. Other colors than white and black are also possible.

Both the white- and black subunits of a barcode can be used to encode data. Therefore it is not advised to replace a white subunit with a dark color, since this may change the value of the encoded data. In the same way one should avoid replacing a black subunit with a bright color.

A "region" of a barcode is defined as an area comprising at least one subunit.

An "image sensor" is a sensor that can detect and acquire a signal of electromagnetic radiation (e.g. arranged in an image or a pattern) and transform the signal into an electrical signal. For many applications related to barcodes, it is the visible range of the electromagnetic spectra that is referred to. The image sensor is in most cases digital. The signal of electromagnetic radiation can be projected radiation or radiation transmitted through an object or reflected from an object, to thereby reach the sensor.

The electrical signal that the image sensor stores (which requires a memory) when it acquires an image signal, can be referred to as a "Digital Sensor Value", DSV. Correspondingly, the input signal given to a display for making the display render an image signal can be referred to as a "Digital Driving Level", DDL. There are known methods to transform color points of a color space to DDL's or DSV's, or vice versa. (E.g. "*Color standard display function: A proposed extension of DICOM GSDF*" by Kimpe et al, Medical Physics, 4 Aug. 2016.) The underlying physical entity of the DDL's or the DSV's can be luminance (e.g. expressed in Candela per square meter), even though the DDL's or DSV's themselves do not have a unit.

The different values of the DDL's or DSV's correspond to different color points in a pre-defined color space. For example, if the color space has three dimensions, a color point could be expressed as the DDL for each of the dimensions, e.g. (DDL dim 1, DDL dim 2, DDL dim 3). Thus, before using procedures according to the present invention, a color space selection should first be performed, unless a standard or a reference color space is already selected. For some frequently used color spaces (e.g., sRGB is commonly used for displays), the system may be customized to a color space upfront, such that all procedures are adapted to the selected color space. Alternatively, the selection of color space can be provided as metadata, e.g. embedded in the barcode as encoded information.

A "gamut" can be a set of colors realizable by an input/output device and takes a different shape in different color spaces. For example, a display's gamut can be a cube in its native RGB space ("the native gamut"), is then a diamond-like shape in 5 CIELAB color space and is a parallelogram in CIEXYZ color space. A display native gamut can be expressed in a certain color space such as RGB or sRGB which is suitable for displays, or in CIELAB or LAB which is suitable for human vision.

Since an image sensor or a display often comprises a sub-set of the full color space (its "color gamut"), it can be necessary to "re-distribute" the DSV's or the DDL's over the available sub-set of color points. This is part of the calibration, which may further comprise compensation for deficiencies due to the external or internal temperature of for example the display device or image sensor device, non-linearity, etc.

A "calibration target" describes how a device should behave. For example, the target behaviour of a display can be described by the luminance and color that the display should output as a targeted or desired response to certain provided DDL's. Similarly, the target behaviour of an image sensor can be described by the DSV's that the image sensor detects as a targeted or desired response to having received light with a certain luminance and color. The calibration target for a display or an image sensor can be referred to as a "target DDL's" or a "target DSV's" respectively.

A "processing unit" can be an electronic circuit, e.g. a central processing unit that can perform operations on a data set. The processing unit can comprise an image processor such as a digital microprocessor. The digital microprocessor may include a CPU or a GPU or may include more than one CPU or more than one GPU or combinations such as a CPU and a GPU. The processing unit can include an input and an output and may include memory.

An "imaging device" can be any type of device or instrument comprising an image sensor, for example a dermatoscope, laparoscope, endoscope, microscope, or any digital media device, such as mobile phone, tablet, laptop, etc. that has access to an embedded or external image sensor. Images and light can travel into the imaging device through the entrance pupil of the imaging device.

An "extension piece" can be put in front of the entrance pupil of an imaging device, or a device which is housing the image sensor, to extend the distance between the image sensor and the object to be investigated, or the object of interest. The extension piece can have a cover glass at the side facing the operator.

A "spacer" can be configured to reduce the contact surface between the image sensor, or a device housing the image sensor, and the object to be investigated. The spacer can have a cover glass at the side facing the operator.

A "color chart" is an object or an image used for performing a color calibration of a device, comprising colored areas where each area has a different color. Such a colored area can be referred to as a "color calibration patch" or a "color patch". The color chart can be used as a reference when performing color calibration.

"Metadata" can be additional information which can be embedded in the barcode as encoded information. Usually, the metadata is provided in a dedicated area of the barcode. Such metadata can carry information on the type of color space which is used, on the type of color chart to be used, on the location of the subunits whose color is a color point, on the target values of the DDL's or DSV's, etc.

"Encoded information" or "encoded data" refers to information encoded in the barcode.

DETAILED DESCRIPTION OF THE INVENTION

The present invention will be described with respect to particular embodiments and with reference to certain drawings, but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein. Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein. The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. Similarly, it is to be noticed that the term "coupled", also used in the description or claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

Elements or parts of the described devices may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to software can encompass any type of programs in any language executable directly or indirectly by a processor.

FIG. 1a) shows a two-dimensional barcode 1 comprising subunits such as 11 that may be composed into patterns such as 12. FIG. 1b) shows an embodiment of the present invention where at least one subunit such as one of the subunits in the regions 13, 14 and 15 has/have been colored such that all subunits within one region have the color of a certain color point in a pre-defined color space, e.g. a standard color space such as CIELAB, RGB, SRGB, CMYK, etc. If the barcode 10 comprises n subunits, there can be up to n number of different color points represented in the barcode. The colored subunits of a barcode can represent a color calibration chart with color patches that can be used for color calibration. FIG. 1c) shows a part of a barcode 20 comprising an embodiment of the present invention, where the color patches, e.g. having colors 21 (green), 22 (blue) and 23 (red), are distributed in the white areas of the barcode. This will be further discussed below.

In a medical or healthcare context, a color calibration chart for a medical diagnostic display may have primarily grey points and one color point or a few color points, while a color calibration chart for e.g. a dermatoscope may have primarily color points. As illustrated in FIG. 1b), a dedicated location 16 (encircled) can be used to provide metadata or encoded data related to the color chart of the barcode, for example to indicate which type of color chart is provided.

One advantage of embodiments of the present invention is that no separate color calibration chart needs to be provided with the system, nor handled by the operator. Hence, embodiments of the present invention provide a user-friendly system for making connected display devices using the same color calibration chart, so that images look or appear the same on the different display devices.

Another advantage is that the color calibration may be performed while the system performs the conventional decoding of the barcode. The conventional barcode information could be used for e.g. pairing devices, or for authentication/authorization of users, etc. The operator does not need to take additional action for performing the color calibration since it can be made automatically. The calibration may be automatically imposed every time the image sensor is imaging the barcode and assures that the calibration is up to date.

It is important that the subunits having a color of a color point in a reference color patch in a color space are or can be added to the barcode without changing the encoded information carried by the subunits. For example, if a black subunit (for example a black square of a QR code) is replaced with a bright grey level (or with a bright color), the encoded data might be changed since brightness and luminance may be used for the decoding.

For example, a simple case is if the color calibration patches comprise only primary colors (for example RGB colors in an RGB color space) and secondary colors (for example a combination of RGB colors in an RGB color space), some of the white subunits (or white background) can be replaced by the primary and secondary colors without interfering with the initial encoded information in the black or grey (or already colored) subunits. Since the color points of primary and secondary colors of a color space are located far from each other in the color space, most image processors will be able to differentiate and identify the displayed primary or secondary colors without additional aid. Black and white are in a similar way separated far from each other in a color space, and the same principle can be applied. Thus, the image processor would still be able to identify the original or initial barcode pattern.

Thus, the present invention also provides an independent or dependent means or method for adding to an existing barcode having initial information, additional information on a color chart in a color space to be used for color calibration of a device, said method comprising the steps of changing the colors of at least one subunit of the barcode to a color point of the color chart, wherein the color changing is performed without altering the initial information of the barcode. Means can be provided for adding (e.g. by an adder) additional information on a color chart in a color space to be used for color calibration of a device, the means for adding being adapted to change the colors of at least one subunit of the barcode to a color point of the color chart, wherein the color changing is performed without altering the initial information of the barcode.

For applying a color chart with higher order color points (i.e. tertiary colors), it may be necessary to distribute the color patches over barcode subunits at various locations, in order to not alter the already encoded information. This distribution method can also be used if the subunits of a barcode already are colored in a color- or grey scale (which may be used for decoding purposes). A result can be that a certain color point can be applied to subunits which are located at arbitrary places in the barcode, as shown in FIG. 1c) for color patches of e.g. green 21, blue 22 and red 23.

A test can be performed to check whether a mapping leaves the initial encoded information intact. The mapping will only be allowed when the initial encoded information is unaltered. Conventional barcode decoding rules (e.g. see "*The Modernization of the QR Code through Color and Brightness Level*" by Joonu Ryu) can be used to evaluate the approval of a mapping.

In case it turns out that there are not enough available subunits to house all the color patches, the barcode can be replaced with a higher-dimensional barcode, for example on-the-fly. For example, a small black and white barcode can be replaced by a color barcode or a multi grey level barcode. This will provide an increased number of possible locations in the barcode for where a certain color calibration patch could be placed without altering the initially encoded information.

The decoding of a barcode may depend on variables such as the number of color points or grey levels present in the barcode for encoding purposes, or the number of pixels per barcode subunit. These variables can determine e.g. the readability of the barcode, the data capacity per printed area, and the amount of encoded information. Hence, the values of these variables can be altered in order to increase the possible ways for how to distribute colors for color calibration on the subunits.

When dealing with primary colors or secondary colors, i.e. black, or white, the image processor can intrinsically identify the color points, in most cases. For a higher order color point it may be necessary to provide metadata (e.g. embedded in the barcode as encoded information, as in location with reference 16 in FIG. 1b) carrying information on the location of a dedicated subunit in the barcode having the higher order color point. If the image processor can identify the color points, but the subunits having those color points are scattered over the barcode, as in FIG. 1c), it may also be more efficient to provide such metadata carrying information on their location in the barcode. A list of pairs, comprising the color point value of the subunit and the corresponding location (for example coordinates) in the barcode can be stored in a look-up table (LUT).

Figure 2:
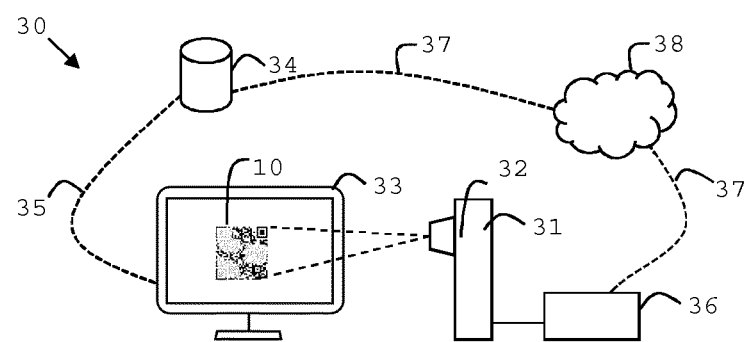
FIG. 2 shows an embodiment of a system comprising the present invention.

FIG. 2 shows a system 30 of an embodiment of the present invention comprising an imaging device 31 having an image sensor 32 which has access to an internal or external processing unit 36. The processing unit 36 can comprise an image processor. The processing unit 36 can include one or more CPUs and/or one or more GPUs or a combination of these. A barcode 10 can be outputted on a display 33 e.g. via an HTML page. The barcode 10 comprises a unique identifier for the display, and the display can be connected to a computer server 34 via a first network 35. The computer server 34 and/or the processing unit 36 can be located on a local network (e.g. within a building or campus) or "in the cloud" (anywhere in the world). Or the processing unit 36 and the computer server 34 may be connected to a cloud server 38 by a second network 37 (which can be any network suitable for the imaging device, e.g. LAN, WLAN, 3G, 4G, etc.).

Since the imaging device 31 may have a small display, the operator may want to display the image acquired by the image device 31 on the larger display 33. The imaging device 31 can connect to the display 33 by having the image sensor 32 imaging the barcode 10 and decode it. The barcode 10 can comprise encoded information needed for the imaging device 31 to connect to the display. The subunits of barcode 10 can be colored according to the present invention, and a color calibration can be performed while or after the display 33 and the imaging device 31 are being connected.

Digital Driving Levels (DDL) are signals provided to a display for driving the display pixels, and Digital Sensor Values (DSV) are signals received from an image sensor as a result of the image sensor receiving light. "Target" DDL's can be provided to a display for making it render a color, and in the ideal case, these DDL's would provide the intended color. Due to environmental impact, drift, etc., the target DDL may not result in the intended color point, and calibration is needed. Likewise, for an image sensor it is expected to receive "target" DSV's if a certain color is shown to the image sensor. The display or the image sensor can be calibrated by adjusting the DDL's or the DSV's, respectively.

In one embodiment of the present invention, the display 33 of FIG. 2 is already calibrated, and the color patches of the barcode 10 can be used to calibrate the image sensor of the imaging device 31. Or alternatively, in case the image sensor 32 is already calibrated, the color patches of the barcode 10 can be used to calibrate the display 33.

Figure 10:
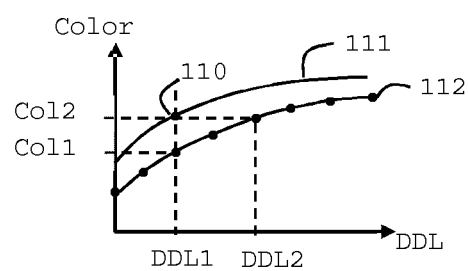
FIG. 10 shows an embodiment of the present invention comprising values of target color points and of actual color points.

FIG. 10 shows a graph representing the color point values as a function of DDL values 112 for an uncalibrated display device and for an ideal or target set of values 111. To generate the color point Col2, the target curve 111 shows that DDL1 should be applied. Target curve 111 can be known upfront. However, since the display is not calibrated, it will perform according to curve 112, so that DDL1 would give Col1. Thus, to obtain Col2, DDL2 needs to be applied. A look-up table with the difference of DDL1 and DDL2 can be created and applied, so that when the display is given DDL1 the system can add the values in the LUT so that the display can output Col 2. The values 112 can be obtained by measuring the output luminance for each dimension in the color space for all (or close to all) DDL's. If a color space has n dimensions, the graph in FIG. 10 would be extended to have n axes and a color point would be represented by a value of each axis. The same reasoning is valid for the DSV provided by an image sensor.

Figure 3:
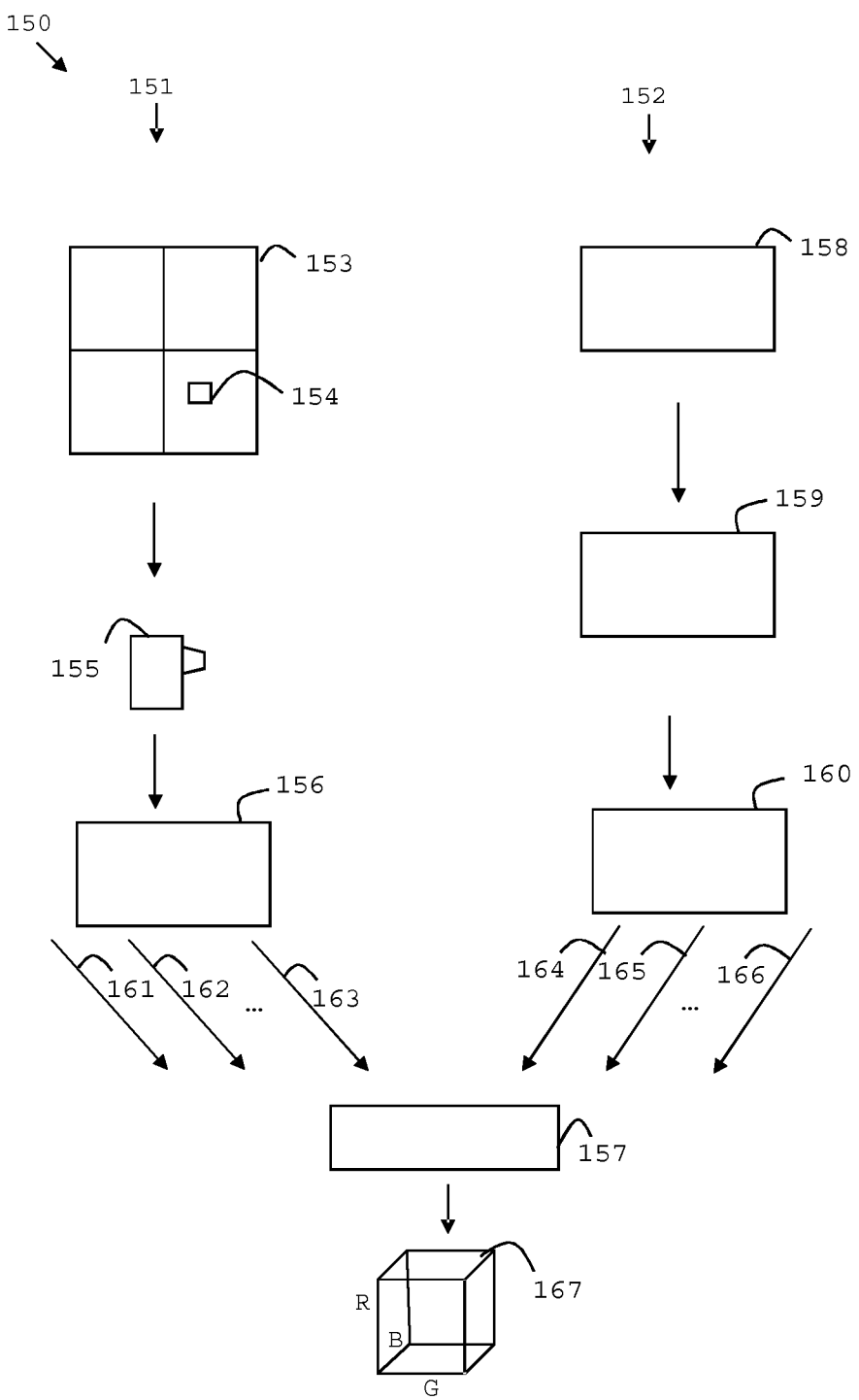
FIG. 3 shows a flow chart of an embodiment of the present invention comprising obtaining an acquired value and a target value.

FIG. 3 shows a flow chart 150 of an embodiment of the present invention comprising a method for calibrating an image sensor by using a display which is calibrated in a pre-defined color space or a standard color space. The flow chart 150 comprises the two routes 151 and 152 for obtaining an acquired value and a target value related to the same color point. The two routes 151 and 152 provide means for obtaining an acquired value and a target value related to the same color point.

Eventually the outcome of the two routes can be compared in step 157. The steps of obtaining the acquired value 151 can comprise having a barcode 153 comprising a subunit 154 having a color point that is preferably present among the reference target color points to be used in route 152. A digital sensor such as a camera 155 can acquire an image of the subunit 154, and the corresponding (acquired) digital sensor values 156 can be extracted and expressed in RGB. Also, an analog sensor can be used provided the recorded analog levels are converted to digital sensor values. These acquired digital sensor values 161 can be sent to a processing unit for later comparison in step 157. The steps of obtaining the target value 158 can comprise the processing unit accessing a target (ideal) value of the reference color point of subunit 154 in e.g. LAB coordinates. The image sensor has a color gamut where the coordinates can be converted into RGB values (step 159). In step 160, the target RGB values can be converted into target digital sensor values. In step 157 the acquired digital sensor values 161 can be compared with the target digital sensor values 164, and the difference can be stored in a calibration look-up table (LUT) 167. The procedure can be repeated for n subunits with different color points, resulting in a difference for each color point, for example (161-164) for color point 1, (162-165) for color point 2, . . . , (163-166) for color point n. For example, n can be four, comprising the values red, green, blue and grey.

Figure 4:
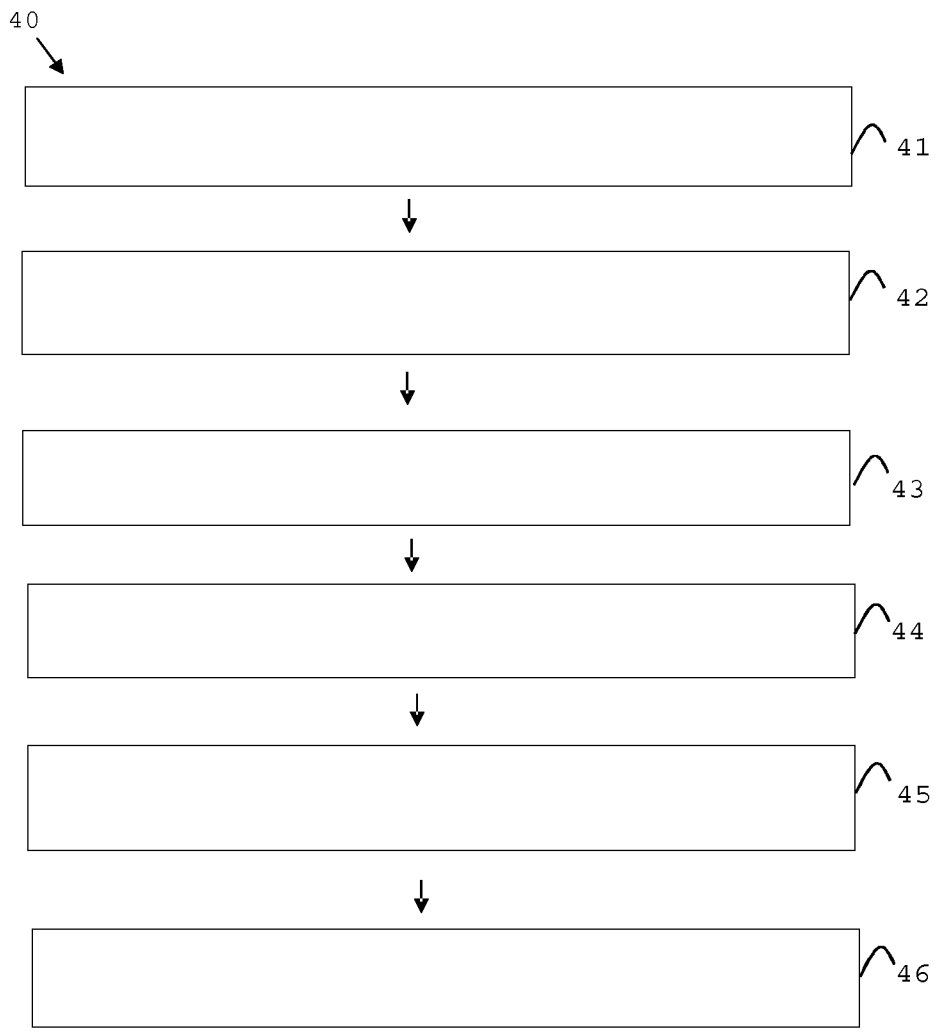
FIG. 4 shows a flow chart of an embodiment of the present invention comprising obtaining a calibration LUT for an image sensor.

FIG. 4 shows an alternative flow chart 40 of an embodiment of the present invention comprising the calibration of an image sensor. The image sensor can acquire an image of the barcode outputted on the calibrated display (step 41). One or more of the barcode subunits can comprise a color calibration patch or color calibration patches (e.g. of a predefined- or standard color space) according to embodiments of the present invention. The image sensor can receive the color points of the one or more color calibration patches, e.g. as luminance values, and map the luminance values onto digital sensor values (step 42). The image sensor can send the acquired barcode image and the digital sensor values to the image processor, (step 43). The image processor receives the acquired barcode image and one or more digital sensor values for which the image processor has a receiver. Optionally, interpolation can be used to increase the number of points of the acquired digital sensor values. The image processor can decode the encoded data and map the received digital sensor values of the barcode image to color points of the color space (step 44). The image processor can receive the target digital sensor values of the corresponding color points for the image sensor (step 45) e.g. via the receiver, for example as metadata embedded in the barcode or from a non-volatile memory. The image processor can calculate the difference between the target- and the acquired digital sensor values for a selection or for all color points, and store the results, for example in a LUT (step 46). The image processor or another processor can provide a calculator such as being provided with software for a calculator, the software providing the calculator when executed on the image processor or the another processor to calculate differences.

Figure 5:
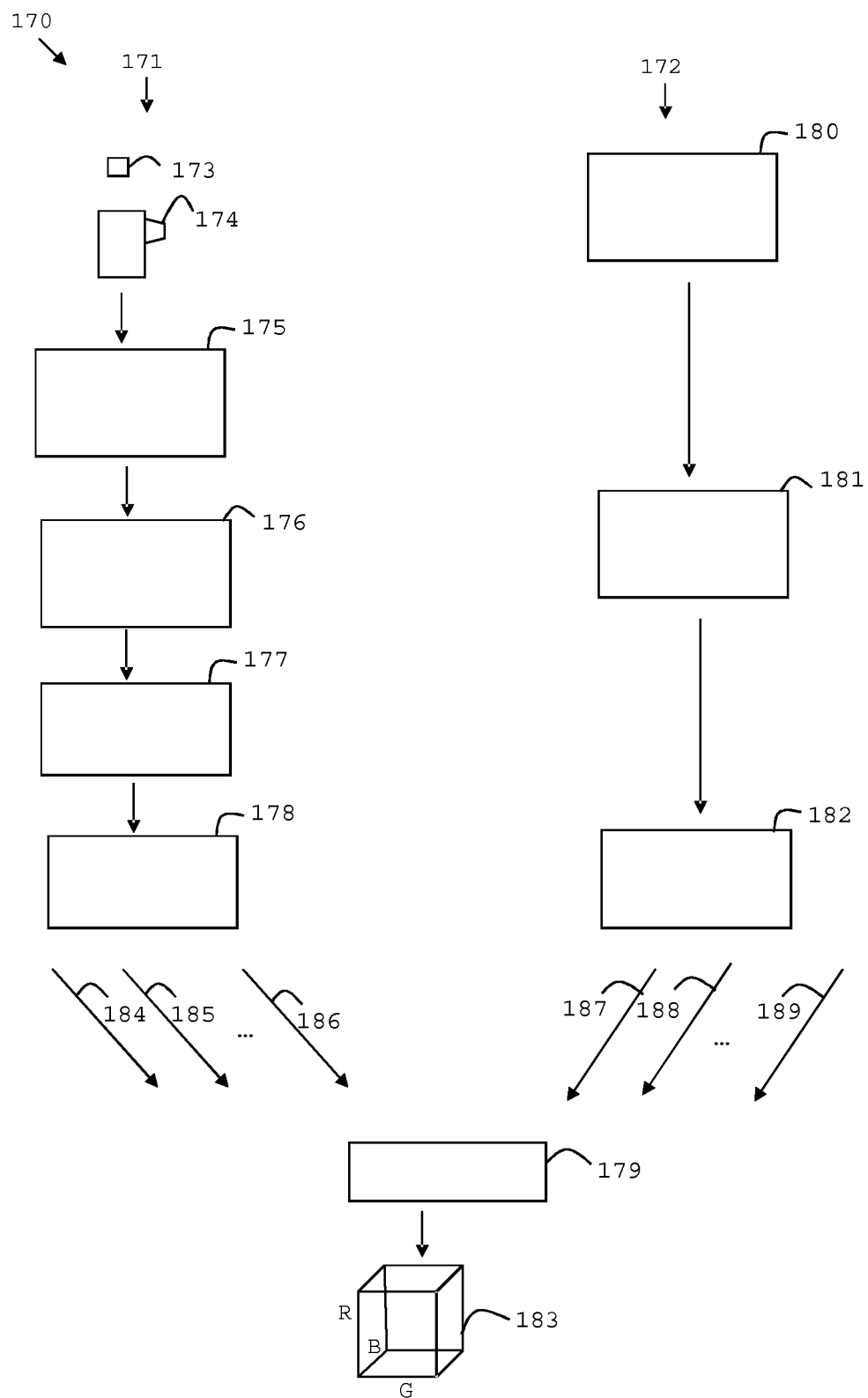
FIG. 5 shows a flow chart of an embodiment of the present invention comprising obtaining the acquired value and the target value.

FIG. 5 shows a flow chart 170 of another embodiment of the present invention where the image sensor is calibrated in a pre-defined- or standard color space. In this embodiment, a barcode can be used to calibrate a display device using a calibrated image sensor. The flow chart 170 comprises the two routes 171 and 172 of obtaining an acquired value and a target value related to the same color point. Eventually, the outcome of the two routes can be compared in step 179. Route 171 comprises a barcode (not shown) having a subunit 173, which has a color point that is preferably present among the reference target color points to be used in route 172. A digital sensor such as camera 174 can acquire an image of the subunit 173, and the corresponding (acquired) digital sensor value or values can be extracted and expressed in RGB co-ordinates, step 175. The RGB values can now be converted to LAB values (step 176). In step 177, these (DSV) LAB values can be mapped onto the LAB values of the display profile (known upfront or be acquired with the calibrated image sensor). The outcome can now be converted back into RGB values to obtain the acquired RGB values of the uncalibrated display device, and further converted into (acquired) digital driving levels (step 178). In route 172 the steps of obtaining the target values 180 of the color point of subunit 173 can comprise the processing unit accessing a target (ideal) value of the reference color point of subunit 173 in e.g. LAB coordinates. The display profile, which is known (or can be acquired) can be converted into RGB values (step 181). In step 182, the target RGB values can be converted into target digital driving levels. In step 179 the acquired digital driving levels 184 can be compared with the target digital driving levels 187, and the difference (184-187) can be stored in a calibration look-up table (LUT) 183.

The procedure can be repeated for n subunits with different color points, resulting in a difference for each color point, for example (184-187) for color point 1, (185-188) for color point 2, . . . , (186-189) for color point n. For example, n can be four, comprising the values red, green, blue and grey.

Establishing the relation between targeted color point values and acquired color point values is known in the art. For example, the relationship between target digital driving levels of the luminance values for a display (or the digital sensor values for an image sensor) and available color points can be device specific and known upfront (cf. curve 111 in FIG. 10). This can be referred to as a "display profile". The luminance and color behaviour of a display can be described by a tristimulus characterization matrix M, i.e. M comprises the amount luminance of each primary color needed to create a color point. The physical unit can be $cd/m^2$. This is for example described in section 3.2 of *Medical color displays and their calibration, Proc. of SPIE Vol.* 7450 August 2009). The color points located between those of the color calibration chart can be obtained by interpolation.

Figure 6:
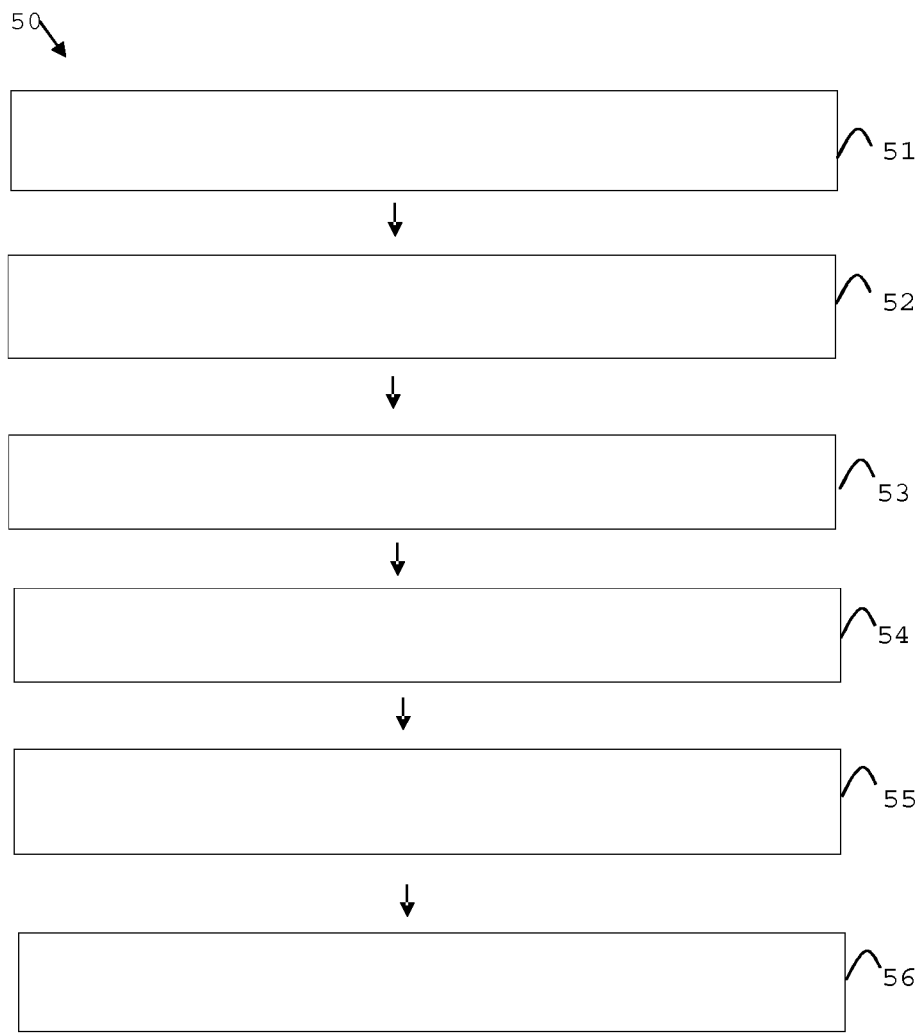
FIG. 6 shows a flow chart of an embodiment of the present invention comprising obtaining a calibration LUT for a display.

FIG. 6 shows an alternative flow chart 50 of an embodiment of the present invention comprising the calibration of a display device. In step 51, a "profile" look-up table of a plurality of DDL's and their corresponding luminance values of the uncalibrated display device can be created, by the (calibrated) image processor, or it can be retrieved from a volatile memory by the image processor. The relationship between the DDL's and The LUT can be created by an internal processor of the image sensor or by an external processor. (FIG. 10 illustrates an example of the relation between DDL's and color points (e.g. luminance)). In one embodiment, all the DDL's and their corresponding luminance values can be provided in the look-up table. In another embodiment of the present invention, a selection of DDL's (for example equally spaced) and their corresponding luminance values can be provided. Preferably, the luminance values in the look-up table can correspond or nearly correspond to the luminance values read by the image sensor of the color points of the barcode image. Interpolation may then be used to increase the number of points.

In step 52, the uncalibrated display can display an image of a barcode, having one or more subunits with one or more color calibration patches according to the present invention, using uncalibrated DDL's. The image sensor can acquire an image of the barcode. The image sensor can receive the image comprising the color points of the color calibration patches, e.g. as acquired luminance values. The image sensor can map the acquired luminance values onto acquired digital sensor values (step 53). The image sensor sends the acquired barcode image and the acquired digital sensor values to the image processor (step 54). The image processor receives the acquired barcode image and one or more digital sensor values for which the image processor has a receiver. Optionally, interpolation can be used to increase the number of points of the acquired digital sensor values. In step 55, the image processor can receive the target digital driving levels of the corresponding color points in the barcode for the display (cf. curve 111 in FIG. 10) e.g. via the receiver, for example as metadata embedded in the barcode or from a non-volatile memory. The image processor can calculate the difference between the target- and the acquired digital sensor values for all the color points, and store the results, for example in a LUT (step 56). The image processor can calculate the difference between the target- and the acquired digital sensor values for a selection or for all color points, and store the results, for example in a LUT (step 56). The image processor or another processor can provide a calculator such as being provided with software for a calculator, the software providing the calculator when executed on the image processor or the another processor to calculate differences.

Referring to FIG. 10, an alternative method embodiment of the present invention can be to vary the DDL input to the display and measure the luminance output with the calibrated image sensor, until the image sensor reports Col2.

The target DDL's or DSV's can be provided to the image processor via the barcode, as embedded metadata, e.g. in the dedicated area 16 of FIG. 1b). The LUTs can be 1D (dimensional), 2D, 3D or even higher dimensional (in case of a multispectral image sensor). The target DDL's or DSV's can also be provided to the image processor by other means, such as through a file, as these target values for the DDL's or DSV's are already available before the acquisition of the barcode image.

Figure 7:
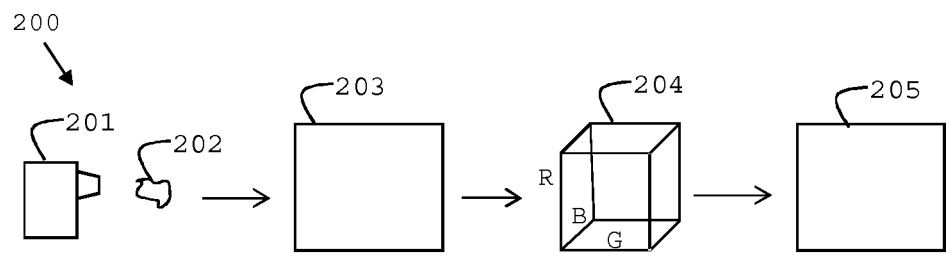
FIG. 7 shows an embodiment of the present invention comprising applying a calibration LUT.

FIG. 7 shows a flow chart 200 of an embodiment of the present invention comprising the application of a calibration LUT. For an uncalibrated image sensor: The image sensor (or camera) 201 acquires an image 203 of an object 202. The image can be stored in the image sensor (or camera) as digital sensor values having a certain resolution, for example with 1280×1024 pixels. Each pixel can have an RGB value which can be corrected with the corresponding correction value of the image sensor calibration LUT 204, and the result is an image expressed in calibrated digital sensor values 205.

In a similar way for an uncalibrated display showing an image (not shown), a display calibration LUT can be applied to the display pixels to correct the digital driving levels used by the display to display the image.

When the image has been corrected with the LUT, the image can be sent to e.g. an image library for storage or to another display. If the image is sent to another display it might be again corrected with a calibration LUT for that display.

Figure 8:
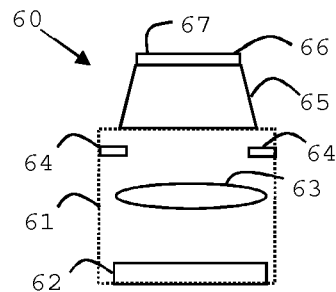
FIG. 8 shows an embodiment of the present invention comprising an extension piece.

FIG. 8 shows another embodiment of the present invention comprising an instrument 60 (for example a dermatoscope) having a housing 61, an image sensor 62, a lens 63, light sources 64, an extension piece 65 comprising a cover glass 66. The barcode 67 can be embedded in the cover glass 66 of the extension piece 65. In this way the color calibration pattern can be combined with other types of calibration patterns (e.g. for calibrating depth or resolution). Further, calibration patterns embedded in the cover glass are always available and make it possible to re-calibrate the sensor whenever suitable, e.g. between imaging sessions. As soon as the operator changes the extension piece, the instrument could automatically get color calibrated. In principle, the barcode 67 could be put directly on the internal cover glass of the instrument 60, without using any extension piece.

Optionally or additionally, the instrument 60 may be connected to an external and/or internal display (not shown here). If the instrument has an internal display, it is not necessary to display the image on this external display. In some cases, the acquired image may be directly sent to e.g. an image library without further modifications. But if the image should be outputted on the instrument internal display, it may be necessary to calibrate this display. The image processor can acquire a calibration pattern, e.g. embedded in a barcode, from an external display or from a cover glass, and remap the acquired digital sensor values onto acquired luminance values. The calibration of the display can then be performed as described above.

In some applications it is preferable to minimize the interaction between the imaging device and the sample surface to be investigated. For example, if the sample is biological living tissue and e.g. a dermatoscope is pressed onto its surface, the pressure will push away the blood at the measurement area. One embodiment of the present invention minimizes the contact area between the sample and the instrument by using a spacer.

Figure 9:
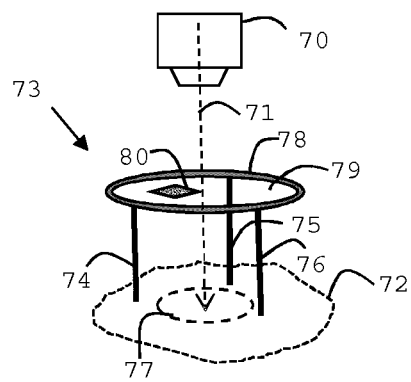
FIG. 9 shows an embodiment of the present invention comprising a spacer device.

FIG. 9 shows an imaging device 70 having an image sensor, looking along the optical axis 71, and configured to acquire images of a sample surface 72. Between the imaging device and the sample surface 72 a spacer 73 having a defined height is provided. The spacer 73 can have a support, e.g. legs 74, 75 and 76, which can rest, or lean, onto the sample surface 72 to be investigated, primarily outside of the camera field of view 77. The support structure, or legs, comprises an upper part 78 that can comprise a transparent material 79 such as glass. A barcode 80 can be embedded within the support structure, for example it can be embedded within the transparent material and positioned such that the image sensor of the imaging device 70 can read the barcode 80, without hindering the region of interest.

Figure 11:
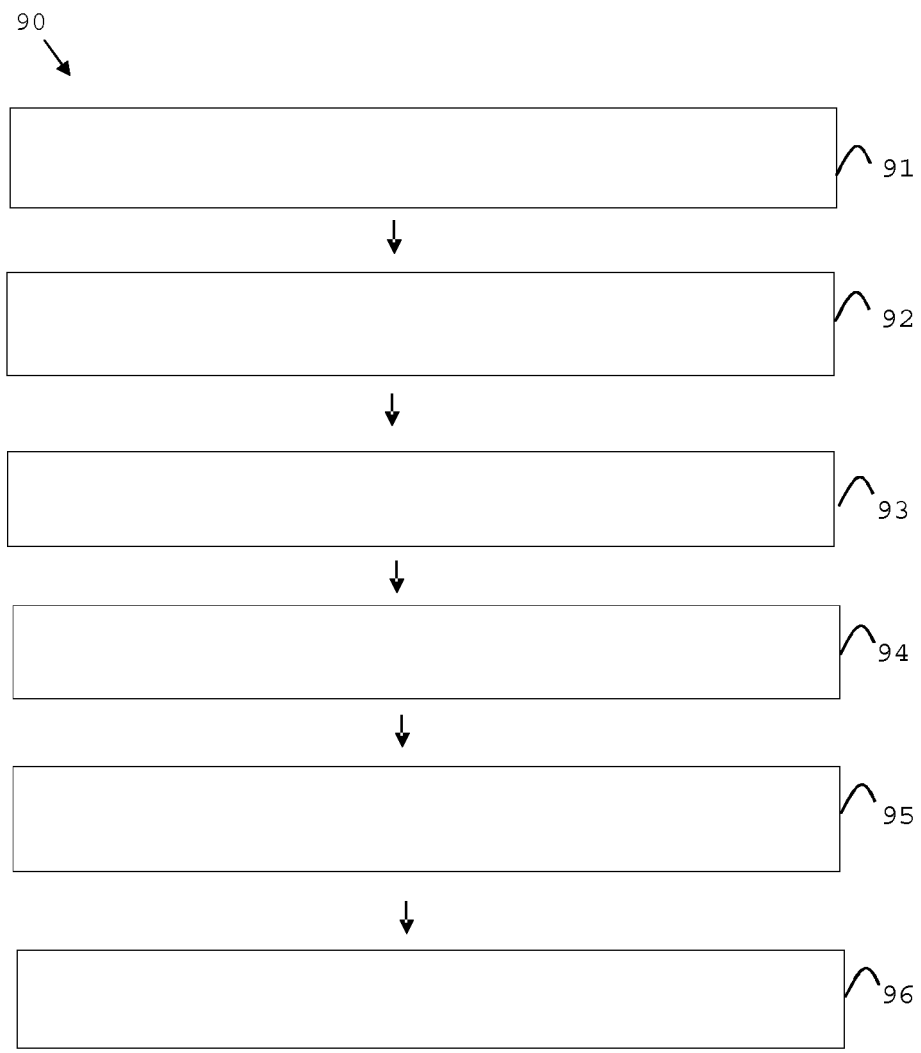
FIG. 11 shows a flow chart of an embodiment of the present invention comprising a barcode embedded in a cover glass.

FIG. 11 shows an embodiment of the present invention comprising a method 90 of calibration of an image sensor when it is associated with a cover glass having an embedded barcode, as in FIG. 8 or 9. The image sensor acquires an image of the barcode embedded in a cover glass (step 91). The barcode subunits comprise color calibration patches as described above, according to the present invention. The colors of the color patches in the barcode are calibrated and can be used as references. The image sensor receives the color points of the color calibration patches, e.g. as luminance values, and maps the luminance values onto digital sensor values (step 92). The image sensor sends the acquired barcode image and the digital sensor values to the image processor (step 93). The image processor receives the acquired barcode image and one or more digital sensor values for which the image processor has a receiver. The image processor decodes the encoded data and maps the digital sensor values of the acquired image to color points of a pre-defined color space (step 94). The image processor receives (e.g. via the receiver) the target digital sensor values of the corresponding color points for the display (step 95) from the barcode as encoded information or from an external source, as these target values are already available before acquisition of the barcode image. The image processor calculates the difference between the target digital sensor values and the acquired digital sensor values and stores the result in a LUT (step 96). The image processor or another processor can provide a calculator such as being provided with software for a calculator which when executed on the image processor or the another processor can calculate differences. This completes the calibration procedure. When the calibration is finalized, the image sensor can acquire an image, and the image processor can adjust the digital sensor values by using the LUT from the calibration, as described in FIG. 7.

In accordance with another embodiment of the present invention software may be implemented as a computer program product which has been compiled for a processing engine to carry out any of the methods of the present invention or is compiled to execute in an interpretative virtual machine such as the Java™ Virtual Machine. A display device may comprise logic encoded in media for performing any step of the steps of the methods according to the present invention. Logic may comprise software encoded in a disk or other computer-readable medium and/or instructions encoded in an application specific integrated circuit (ASIC), field programmable gate array (FPGA), or other processor or hardware. A display will also include a CPU and/a GPU and memory, the CPU and/or GPU having a processing engine able to execute software of the present invention. The software can be embodied in a computer program product adapted to carry out the following functions when the software is loaded onto the respective device or devices and executed on one or more processing engines such as microprocessors, ASIC's, FPGA's etc. The software mentioned above can be stored on a non-transitory signal storage medium, such as an optical disk (CD-ROM or DVD-ROM); a magnetic tape, a magnetic disk, a ROM, or a solid state memory such as a USB flash memory or similar.

The different embodiments of the invention are described below, where different features are combinable in different ways within the scope of the invention:

Embodiment 1—A method carried out by a computer to generate a color calibration LUT using a barcode image for an image sensor to achieve a target behaviour, said barcode comprising encoded data in subunits of the barcode and wherein at least one subunit of the barcode has a color point representing a reference color point in a color space, and wherein the target behaviour of the image sensor is defined by target digital sensor values, the method comprising the steps of:
receiving a digital image of the barcode acquired with the image sensor, the digital image being stored with one or more received digital sensor values, for each of the at least one subunit having a reference color point,
retrieving one value of the received digital sensor values,
obtaining the target digital sensor value for the image sensor corresponding to the reference color point, calculating the difference between the received digital sensor value and the obtained target digital sensor value of the image sensor for the reference color point, and creating a calibration LUT of the image sensor for adjusting the received digital sensor values of the color point based on the calculated difference.

Embodiment 2: A method carried out by a computer to generate a color calibration LUT for a display using a barcode image and a calibrated image sensor for the display to achieve a target behaviour, said barcode comprising encoded data in subunits of the barcode and wherein at least one subunit of the barcode has a target color point in a color space, and wherein the target behaviour of the display device is defined by the at least one target color point, the method comprising the steps of:
displaying an image of the barcode on the display, the barcode image being displayed with first digital driving levels, acquiring a digital image of the barcode image displayed by the display device with the calibrated image sensor, receiving the acquired digital image, the digital image being stored with one or more digital sensor values, for each of the at least one subunit having a target color point,
obtaining the acquired color point corresponding to the received digital sensor values using the received digital sensor values and the calibrated sensor profile, obtaining digital driving levels corresponding to the acquired color point using the display profile,
obtaining the target color point of the subunit
obtaining target digital driving levels corresponding to the target color point, calculating a difference between the obtained digital driving levels and the target digital driving levels,
creating a calibration LUT of the display for adjusting the digital driving levels of the display to compensate for the calculated difference.

Embodiment 3: A method according to Embodiments 1 or 2, wherein the barcode is embedded in a cover glass provided in the field of view of the image sensor.

Embodiment 4: A method according to any of the preceding Embodiments, wherein the encoded data of the barcode comprises information on the target value and the location of each color point in the barcode.

Embodiment 5: A method according to any of the preceding Embodiments, wherein the encoded data of the barcode comprises information on at least one of:
the type of color space to be used, the type of color chart to be used, the location of the subunits whose color is a color point, on target values of DDLs or DSVs.

Embodiment 6: A method according to any of the preceding Embodiments, wherein n subunits have the color of a color point of the color chart.

Embodiment 7: A method according to Embodiment 6, wherein a multiple of adjacent subunits having the same color point are grouped in a region.

Embodiment 8: A method according to Embodiment 6, wherein subunits having the same color point are not adjacent.

Embodiment 9: A method according to any of the preceding Embodiments, wherein a dedicated location of the barcode is used to provide metadata or encoded data related to the color chart of the barcode.

Embodiment 10: A method according to Embodiment 9, wherein the dedicated location of the barcode is used to provide metadata or encoded data related to the color chart of the barcode to indicate which type of color chart is provided.

Embodiment 11: A method according to any of the preceding Embodiments, wherein the at least one subunit having a color of a color point of a color chart is such that the encoded information carried by the subunit is not affected by the color of the subunit.

Embodiment 12: A method according to any of Embodiments 5 to 11, wherein color patches of the color chart are distributed over barcode subunits at various locations, without altering the encoded information.

Embodiment 13: A method according to Embodiment 12, comprising testing that the encoded data is intact by using barcode decoding rules.

Embodiment 14: A method according to any of the preceding Embodiments, wherein the at least one subunit having a color point of a color chart comprises at least one of primary colors, secondary colors, tertiary colors.

Embodiment 15: A method according to any of the preceding Embodiments, comprising a non-volatile memory, wherein a target DSV or DDL is/are available from at least one of the non-volatile memory or the barcode.

Embodiment 16: A method according to any of the preceding Embodiments, comprising a user menu, wherein a target DSV or DDL is/are available from the user menu.

Embodiment 17: A method according to any of the preceding Embodiments, wherein the barcode is a matrix code or a two-dimensional barcode.

Embodiment 18: A method according to any of the preceding Embodiments, wherein the subunits have the shape of squares, rectangles, triangles, hexagons, dots, circles or bars.

Embodiment 19: A method according to any of the preceding Embodiments, further comprising the step of adding to an existing barcode having initial information, additional information on a color chart in a color space to be used for color calibration of a device, said method comprising the steps of changing the colors of at least one subunit of the barcode to a color point of the color chart, wherein the color changing is performed without altering the initial information of the barcode.

Embodiment 20: A method according to Embodiment 19, further comprising the steps of:
selecting a subunit having an initial color,
changing the initial color of the subunit to a new color point of the color chart, checking if the initial information of the barcode is intact,
if the initial information is intact, keeping the new color point on the subunit, if the initial information is altered, revert to the initial color of the subunit.

Embodiment 21: A method according to Embodiments 19 or 20, further comprising the step of adding encoded information to the barcode which encoded information comprises information on at least one of the type of color space to be used, on the type of color chart to be used, on the location of the subunits whose color is a color point, on the target values of DDLs or DSVs.

Embodiment 22: A method according to any of Embodiments 19 to 21, wherein for a barcode of order n, the method comprises the step of transforming the barcode into a barcode of order n+1.

Embodiment 23: A method according to any of the Embodiments 2 to 22, said method being suitable for being applied on an imaging device, said imaging device comprising a display and an image sensor, the method further comprising the step of calibrating the display of the imaging device.

Embodiment 24: A method according to any of the preceding Embodiments, wherein the barcode is a QR code.

Embodiment 25: A data processing system comprising means for carrying out the steps of the method of any of Embodiments 1 to 24.

Embodiment 26: A data processing system for generating a color calibration LUT having a barcode image for an image sensor to achieve a target behaviour, said barcode comprising encoded data in subunits of the barcode and wherein at least one subunit of the barcode has a color point representing a reference color point in a color space, and wherein the target behaviour of the image sensor is defined by target digital sensor values, the system comprising:
  a receiver for receiving a digital image of the barcode acquired with the image sensor, the digital image being stored with one or more received digital sensor values,
  for each of the at least one subunit having a reference color point,
    means for retrieving a received digital sensor value,
    means for obtaining the target digital sensor value for the image sensor corresponding to the reference color point,
    a calculator for calculating the difference between the received digital sensor value and the obtained target digital sensor value of the image sensor for the reference color point, and
  a calibration LUT of the image sensor and means for adjusting received digital sensor values of the color point based on the calculated difference.

Embodiment 27: A data processing system for generating a color calibration LUT for a display using a barcode image and a calibrated image sensor for the display to achieve a target behaviour, said barcode comprising encoded data in subunits of the barcode and wherein at least one subunit of the barcode has a target color point in a color space, and wherein the target behaviour of the display device is defined by the at least one target color point, the system comprising:
  a display for displaying an image of the barcode on the display, the barcode image being displayed with first digital driving levels,
  means for acquiring a digital image of the barcode image displayed by the display device with the calibrated image sensor,
  receiver for receiving the acquired digital image, the digital image being stored with received digital sensor values,
  for each of the at least one subunit having a target color point,
    means for obtaining the acquired color point corresponding to the received digital sensor values using the received digital sensor values and the calibrated sensor profile,
    means for obtaining obtained digital driving levels corresponding to the acquired color point using the display profile
    means for obtaining the target color point of the subunit
    means for obtaining target digital driving levels corresponding to the target color point,
    a calculator for calculating a difference between the obtained digital driving levels and the target digital driving levels, and
  a calibration LUT of the display for adjusting the obtained digital driving levels of the display to compensate for the calculated difference.

Embodiment 28: A data processing system according to Embodiments 26 or 27, comprising a processing engine adapted to execute the generating of the color calibration LUT.

Embodiment 29: A data processing system according to any of the Embodiments 26 to 28 wherein the barcode is embedded in a cover glass provided in the field of view of the image sensor.

Embodiment 30: A data processing system according to any of the Embodiments 26 to 29, wherein the encoded information of the barcode comprises information on the target value and the location of each color point in the barcode.

Embodiment 31: A data processing system according to any of the Embodiments 26 to 30, wherein the encoded data of the barcode comprises information on at least one of the type of color space to be used, on the type of color chart to be used, on the location of the subunits whose color is a color point, on the target values of DDLs or DSVs.

Embodiment 32: A data processing system according to any of the Embodiments 26 to 31, wherein n subunits have the color of a color point of the color chart.

Embodiment 33: A data processing system according to Embodiment 32, wherein a multiple of adjacent subunits having the same color are grouped in a region.

Embodiment 34: A data processing system according to Embodiment 32, wherein subunits having the same color are not adjacent to each other.

Embodiment 35: A data processing system according to any of the Embodiments 26 to 34, wherein a dedicated location of the barcode provides metadata or encoded data related to the color chart of the barcode, for example to indicate which type of color chart is provided.

Embodiment 36: A data processing system according to any of the Embodiments 26 to 35, wherein the at least one subunit having a color of a color point of a color chart is such that the encoded information carried by the subunit is not affected by the color of the subunit.

Embodiment 37: A data processing system according to any of Embodiments 31 to 36, wherein color patches of the color chart are distributed over barcode subunits at various locations, without altering the encoded information.

Embodiment 38: A data processing system according to Embodiment 37, comprising means for testing that the encoded data is intact by using barcode decoding rules.

Embodiment 39: A data processing system according to any of the Embodiments 26 to 38, wherein the at least one subunit having a color point of a color chart comprises at least one of primary colors, secondary colors, tertiary colors.

Embodiment 40: A data processing system according to any of the Embodiments 26 to 39, comprising a non-volatile memory, wherein a target DSV and/or DDL is/are available from at least one of the non-volatile memory and the barcode.

Embodiment 41: A data processing system according to any of the Embodiments 26 to 40, comprising a user menu, wherein target DSV and/or DDL is/are available from the user menu.

Embodiment 42: A data processing system according to any of the Embodiments 26 to 41, wherein the barcode is a QR code.

Embodiment 43: A data processing system according to Embodiment 42, wherein the subunits have the shape of squares, rectangles, triangles, hexagons, dots, circles or bars.

Embodiment 44: A data processing system for adding to an existing barcode having initial information, additional information on a color chart in a color space to be used for color calibration of a device, said system comprising means for changing the colors of at least one subunit of the barcode to a color point of the color chart, wherein the color changing is performed without altering the initial information of the barcode.

Embodiment 45: A data processing system according to Embodiment 44, further comprising:
 a selector for selecting a subunit having an initial color,
 means for changing the initial color of the subunit to a new color point of the color chart,
 means for checking if the initial information of the barcode is intact, and if the initial information is intact, keeping the new color point on the subunit,
 if the initial information is altered, reverting to the initial color of the subunit.

Embodiment 46: A data processing system according to Embodiments 44 or 45, further comprising an adder for adding encoded information to the barcode which encoded information comprises information on at least one of the type of color space to be used, on the type of color chart to be used, on the location of the subunits whose color is a color point, on the target values of DDLs or DSVs.

Embodiment 47: A data processing system according to any of the Embodiments 26 to 46, wherein for a barcode of order n, the method comprises the step of transforming the barcode into a barcode of order n+1.

Embodiment 48: A data processing system according to any of the Embodiments 26 to 47, comprising an imaging device, said imaging device comprising a display and an image sensor, the data system being further adapted to calibrate the display of the imaging device.

Embodiment 49: A data processing system according to any of Embodiments 43 to 48, wherein the barcode is a QR code.

Embodiment 50: A method for adding to an existing barcode having initial information, additional information on a color chart in a color space to be used for color calibration of a device, said method comprising the steps of changing the colors of at least one subunit of the barcode to a color point of the color chart, wherein the color changing is performed without altering the initial information of the barcode.

Embodiment 51: A method according to Embodiment 50, further comprising the steps of
 selecting a subunit having an initial color,
 changing the initial color of the subunit to a new color point of the color chart,
 checking if the initial information of the barcode is intact,
 if the initial information is intact, keeping the new color point on the subunit,
 if the initial information is altered, revert to the initial color of the subunit.

Embodiment 52: A method according to Embodiments 50 or 51, further comprising the step of adding encoded information to the barcode which encoded information comprises information on at least one of the type of color space to be used, on the type of color chart to be used, on the location of the subunits whose color is a color point, on the target values of DDLs or DSVs.

Embodiment 53: A method according to any of Embodiments 50 to 52, wherein for a barcode of order n, the method comprises the step of transforming the barcode into a barcode of order n+1.

Embodiment 54: A computer program product which, when executed on a processing engine, carries out any of the methods of Embodiments 1 to 24 and 50 to 53.

Embodiment 55: A non-transient signal storage medium storing the computer program product of Embodiment 54.

Embodiment 56: An imaging device comprising an image sensor and a display to display images acquired with the image sensor, said imaging device further comprising the computer program product according to Embodiments 54 or 55 for calibrating the display.

Embodiment 57: An imaging device according to Embodiment 56, wherein the imaging device is a dermatoscope.

The invention claimed is:

1. A method carried out by a computer to generate a color calibration look-up-table (LUT) using a barcode image for an image sensor to achieve a target behaviour, said barcode comprising encoded data in subunits of the barcode and wherein at least one subunit of the subunits of the barcode has a color point representing a calibration pattern, and wherein the target behaviour of the image sensor is defined by target digital sensor values, the method comprising the steps of:
 receiving a digital image of the barcode acquired with the image sensor, the digital image being stored with one or more received digital sensor values,
 for each of the at least one subunit of the subunits representing the calibration pattern and having the color point, wherein the encoded data includes metadata having information related to the color point of the calibration pattern, wherein the information includes a target digital sensor value and a location of each color point in the barcode in (x,y) coordinates,
 retrieving one value of the received digital sensor values,
 obtaining the target digital sensor value for the image sensor corresponding to the color point of the calibration pattern,
 calculating the difference between the received digital sensor value and the obtained target digital sensor value of the image sensor for the color point of the calibration pattern, and
 creating a calibration LUT of the image sensor for adjusting the received digital sensor values of the color point based on the calculated difference to calibrate the image sensor to acquire an image based on the color point of the calibration pattern.

2. The method according to claim 1, wherein n subunits have the color of a color point of a color chart.

3. The method according to claim 2, wherein subunits having the same color point are not adjacent.

4. The method according to claim 1, wherein a dedicated location of the barcode is used to provide the encoded data related to the color chart of the barcode.

5. The method according to claim 1, comprising a non-volatile memory, wherein a target DSV or DDL is/are available from at least one of the non-volatile memory or the barcode.

6. The method according to claim 1, comprising a user menu, wherein a target DSV or DDL is/are available from the user menu.

7. A non-transient signal storage medium storing a computer program product, which, when executed on a processing engine, carries out the method of claim 1.

8. An imaging device comprising an image sensor and a display to display images acquired with the image sensor, said imaging device further comprising the non-transient signal storage medium of claim 7 for calibrating the display of the imaging device.

9. The imaging device according to claim 8, wherein the imaging device is a dermatoscope.

10. A data processing system for generating a color calibration look-up-table (LUT) having a barcode image for an image sensor to achieve a target behaviour, said barcode comprising encoded data in subunits of the barcode and wherein at least one subunit of the subunits of the barcode has a color point representing a calibration pattern, and wherein the target behaviour of the image sensor is defined by target digital sensor values, the system comprising:
- a receiver for receiving a digital image of the barcode acquired with the image sensor, the digital image being stored with one or more received digital sensor values, for each of the at least one subunit of the subunits representing the calibration pattern and having the color point, wherein the encoded data includes metadata having information related to the color point of the calibration pattern, wherein the information includes a target digital sensor value and a location of each color point in the barcode in (x,y) coordinates,
- means for retrieving a received digital sensor value,
- means for obtaining the target digital sensor value for the image sensor corresponding to the color point of the calibration pattern,
- a calculator for calculating the difference between the received digital sensor value and the obtained target digital sensor value of the image sensor for the color point of the calibration pattern, and
- a calibration LUT of the image sensor and means for adjusting received digital sensor values of the color point based on the calculated difference to calibrate the image sensor to acquire an image based on the color point of the calibration pattern.

11. The data processing system according to claim 10, wherein n subunits have the color of a color point of the color chart.

12. The data processing system according to claim 11, wherein subunits having the same color are not adjacent to each other.

13. The data processing system according to claim 10, wherein a dedicated location of the barcode provides the encoded data related to the color chart of the barcode to indicate which type of color chart is provided.

14. The data processing system according to claim 10, comprising a non-volatile memory, wherein a target DSV and/or DDL is/are available from at least one of the non-volatile memory and the barcode.

15. The data processing system according to claim 10, comprising a user menu, wherein target DSV and/or DDL is/are available from the user menu.

16. The data processing system according to claim 10, comprising an imaging device, said imaging device comprising a display and an image sensor, the data processing system being further adapted to calibrate the display of the imaging device.

\* \* \* \* \*